United States Patent
Maloney et al.

[11] Patent Number: 6,108,555
[45] Date of Patent: Aug. 22, 2000

[54] ENCHANCED TIME DIFFERENCE LOCALIZATION SYSTEM

[75] Inventors: John E. Maloney, Springfield; Charles J. Hinkle, Jr., Vienna; James O. Stevenson, Fairfax, all of Va.

[73] Assignee: KSI, Inc., Annandale, Va.

[21] Appl. No.: 08/772,871

[22] Filed: Dec. 26, 1996

Related U.S. Application Data

[60] Provisional application No. 60/017,899, May 17, 1996.

[51] Int. Cl.[7] .................................................... H04B 7/00
[52] U.S. Cl. ........................ 455/456; 455/422; 342/457
[58] Field of Search .................................... 455/422, 424, 455/456, 457, 502, 503, 67.1, 67.2, 186.1; 340/988, 990, 991, 992, 993, 994; 342/356, 357, 450, 454, 457; 301/207

[56] References Cited

U.S. PATENT DOCUMENTS

| | | | |
|---|---|---|---|
| 4,728,959 | 3/1988 | Maloney et al. | 342/457 |
| 4,742,357 | 5/1988 | Rackley | 342/457 |
| 4,799,062 | 1/1989 | Sanderford, Jr. et al. | 342/450 |
| 5,003,317 | 3/1991 | Gray et al. | 342/457 |
| 5,045,860 | 9/1991 | Hodson | 342/451 |
| 5,056,106 | 10/1991 | Wang et al. | 375/1 |
| 5,095,500 | 3/1992 | Taylor et al. | 455/424 |
| 5,119,104 | 6/1992 | Heller | 342/450 |
| 5,163,004 | 11/1992 | Rentz | 364/460 |
| 5,166,694 | 11/1992 | Russell et al. | 342/457 |
| 5,218,367 | 6/1993 | Sheffer et al. | 342/457 |
| 5,225,809 | 7/1993 | Bunn | 340/574 |
| 5,264,857 | 11/1993 | Baghdady | 342/433 |
| 5,293,642 | 3/1994 | Lo | 455/33.1 |
| 5,299,132 | 3/1994 | Wortham | 364/460 |
| 5,311,195 | 5/1994 | Mathis et al. | 342/457 |
| 5,317,323 | 5/1994 | Kennedy et al. | 342/457 |
| 5,319,374 | 6/1994 | Desai et al. | 342/387 |
| 5,428,546 | 6/1995 | Shah et al. | 364/449 |
| 5,465,289 | 11/1995 | Kennedy, Jr. | 379/59 |
| 5,719,584 | 2/1998 | Otto | |
| 5,724,660 | 3/1998 | Kauser et al. | 455/456 |
| 5,859,612 | 1/1999 | Gilhousen | 342/457 |

FOREIGN PATENT DOCUMENTS

| | | |
|---|---|---|
| 0335558 | 3/1989 | European Pat. Off. |
| 4409178 | 3/1994 | Germany . |
| 2310098 | 2/1996 | United Kingdom . |
| 9500821 | 6/1994 | WIPO . |
| 9601531 | 3/1995 | WIPO . |
| 9614588 | 11/1995 | WIPO . |
| 9642179 | 5/1996 | WIPO . |

OTHER PUBLICATIONS

Siuru, Bill "On–Board Navigation Systems for Your Car" pp. 39–42, 92, Popular Electronics, Jan., 1993.

Bethel, R.E. and Paras, G.J., "A PDF Multitarget Tracker," *IEEE Transactions on Aerospace and Electronic Systems*, vol. 30, No. 2, Apr. 1994,. pp. 386–403.

*Primary Examiner*—Thanh Cong Le
*Attorney, Agent, or Firm*—Sterne, Kessler, Goldstein & Fox P.L.L.C.

[57] ABSTRACT

A method and apparatus for locating a mobile radio communications transceiver in a cellular-telephone or cellular-like communications system use a simplified system for passive monitoring of the signals emitted by the transceiver. Two receiving base stations can determine the timing of signal arrivals from the remote transceiver. This timing information is then combined with collateral, position-sensitive information to determine the likely location of the transceiver. The present invention has particular applicability to roadway transportation in that it facilitates enhanced emergency services and roadside assistance in response to calls for assistance, and it permits the passive monitoring of traffic flow.

71 Claims, 5 Drawing Sheets

ENCHANCED TIME DIFFERENCE LOCALIZATION SYSTEM

RELATED APPLICATION

This application claims the benefit of the filing date of Provisional Application Ser. No. 60/017,899, filed May 17, 1996.

BACKGROUND AND SUMMARY OF THE INVENTION

The present invention is directed to determining the geographic location of a mobile radio communications transmitter that is part of a wireless cellular communications system so as to facilitate emergency service responses, roadside assistance, traffic monitoring, or other services that can apply or be supported by the location information.

Cellular-telephone systems now provide ready access to wireless telephone communications. Cellular telephones typically operate in an analog system of frequency division multiple access (FDMA). Digital technologies, including time division multiple access (TDMA) or code division multiple access (CDMA), offer greater capacity and should give more individuals simultaneous access to cellular telephone services. In addition, "cellular-like" communications systems, such as a personal communication system (PCS), may further increase the number of individuals with access to a wireless communication network.

A cellular-telephone or cellular-like communication system is a system with a network of fixed base stations serving local areas (i.e., "cells") providing an integrated communication service to a plurality of mobile transmitter/receiver ("transceiver") units, e.g., cellular telephones. Such a communications network attempts to communicate with each transceiver from the base station which provides the optimal communication. The optimal base station is usually, but not necessarily, the one nearest the mobile transceiver. To provide the optimal communications support, the network need not locate the geographic position of the mobile transceiver more accurately than needed to determine which base station to use.

The inability of existing communication networks for cellular-telephone or cellular-like communication systems to accurately determine the location of a mobile transmitter is a major disadvantage in an emergency. For example, public safety officials in Los Angeles estimate that, today, a quarter of all who call the emergency number ("9-1-1") from a cellular telephone do not know where they are when they call. The time spent in finding their location delays emergency assistance units, for example, police or ambulance services, in providing assistance. Other studies indicate that in excess of sixty percent of traffic fatalities in the United States occur on rural roadways. Delays caused by uncertainty in location exacerbate the inherently longer response times for providing emergency services in rural areas.

The problem of locating the position of a mobile radio transceiver has been solved in many ways for many years but in systems other than that of a cellular-telephone or cellular-like communication system. No simple, low-cost solution has been found that is practical when applied to the wide-scale monitoring of mobile telephones. One practical difficulty in implementing any type of localization for mobile radio transceivers is the cost of the modifications either to the transceiver or to the communications network (infrastructure) that are needed to determine the location of the mobile transceiver. Any given transceiver would rarely, if ever, be used in placing a request for emergency or roadside assistance. Thus, the suppliers of transceivers and the operators of communications networks have little economic incentive to increase the complexity (and cost) of the transceivers or to install an extensive and expensive infrastructure to support such rarely used services absent government mandate. However unprofitable in the short term, the value of emergency assistance and roadside assistance services have unquestionable value for providing and enhancing personal and public safety. Ameliorating the increasing incidence of violence and the related, growing concern for personal security with a mobile communications system is a worthy policy goal with the potential for realizing enormous benefit to subscribers, network operators, and the general public alike. However, realizing the objective, even one so important and valuable, requires a practical, inexpensive infrastructure for uniquely identifying people requesting or reporting the need for assistance, communicating with them, and providing their locations to a responding assistant.

Techniques exist for accurately determining one's position in applications other than that of providing emergency or roadside assistance. For example, the satellite-based Global Positioning System (GPS) allows determination of the location of the point of GPS signal reception with a special-purpose receiver for the wireless GPS signals that are broadcast from the satellites. However, obtaining the position of a communications transceiver by using GPS requires the mobile transceiver to include a GPS receiver. GPS receivers are expensive. Even if their cost were to be reduced through mass production, GPS receivers would still have to be integrated with all existing and future mobile transceivers. The cost associated with this solution seems to be prohibitive in view of the infrequency of use of the service and especially in terms of the large number of mobile transceivers already in use both in the U.S. and abroad for which the localization capability is desired.

Techniques also exist for locating the position of mobile communications transceivers by passively monitoring their radio emissions. However, with the simplest of approaches, radio localization does not take into consideration the distortions in apparent location caused by multipath interference (multipathing). Multipathing involves radio signals bouncing off of objects such as vehicles, buildings, hillsides, etc. Without consideration of these effects, the apparent position of the transceiver will be distorted. Multipath propagation is common for short-wavelength, radio communications since relatively smaller objects can reflect substantial amounts of the transmitted signals, and it is especially common in cities with buildings reflecting the signals. The potential, multipath-induced distortions in the apparent position of the mobile transceiver is therefore a problem that must be addressed in passively localizing radio emitters to support applications such as the provision of emergency or roadside assistance.

Multipath propagation conditions need not impede locating a transceiver when signal analysis and source localization procedures are used to ameliorate potential distortions in apparent position. For example, U.S. Pat. No. 4,728,959 to Maloney et al. demonstrates how direction finding procedures, by which the direction angle of the arrival (DOA or AOA) of a signal can be measured, can be applied with two or more receiving base stations. Using the passive monitoring of communication signals that is described in this patent to determine location is an excellent application in that it allows for locating a mobile transceiver anywhere in a service area of a network having at least two receiving stations of known location. The direction finding approach is simple and accurate, but requires a directional antenna at each receiving site. With similar attention to multipath effects, the requirement for directional antennas can be mitigated by the use of time-difference-of-arrival (TDOA) measurements, which can be obtained with omni-directional antennas and with accurate time-base maintenance facilities. Localization with TDOA measurements requires reception at three or more sites, since each pair of sites only enables one TDOA measurement, and each TDOA measurement only specifies a hyperbola (in two dimensions) along which the transmitter can be. Even in a multipath-affected environment, TDOA measurements with at least a triplet of receiving sites can be analyzed to obtain transmitter locations. However, the necessity of requiring joint reception of a common signal at three or more sites with time-maintenance facilities can increase the complexity and cost of the TDOA approach beyond what some cellular telephone or PCS companies are currently or may be willing to accept.

Often, in addition to timing and directional data that can be derived from received signal characteristics, other information is available or can be obtained that relates to the position of a mobile radio transceiver. For example, in a system designed to provide emergency roadside assistance, we may presume that the person requesting assistance is in a vehicle that is on or near a road. Such a presumption may be verified, for example, by asking the person placing the call if he or she is on a road. This type of additional geographic or topological information, called here "collateral information," is of a type that is normally available to a dispatcher. Combining collateral information with the timing information from two (rather than three or more) base stations can define the location of a mobile radio transceiver well enough to make it possible to dispatch emergency and roadside assistance services. The derivation of the position of the transceiver solely from observed characteristics of its radio emissions received at only two sites is adequate, and the need for additional base stations to derive location thus becomes redundant. However, no proposal to date has sought to use such collateral information to make redundant the need for additional base stations.

Monitoring mobile transceivers that are located on vehicles has advantages other than providing support for responses to requests for assistance. One such advantage is enabling the cost effective monitoring of traffic flow. Unplanned traffic incidents ("traffic jams") clog the highways with a resulting deleterious effects on safety, environment, and economy. The volume of message traffic in a major metropolitan area is a type of collateral information, and it can be combined with observed location- and speed-related information and topographic information (e.g., road maps), to indicate which roads are passable and which are congested. However, traffic flow information, emergency services, and roadside assistance, are not the primary reason for establishing a communication system and thus are not provided currently by communications systems. The cost of adding equipment to the communications infrastructure to provide traffic flow information seems justifiable to communications companies only if it can be done using the most modest of infrastructure enhancements.

Today, techniques exist that provide partial and complex solutions to the problem of providing geographical locations with sufficient accuracy to aid emergency and roadside assistance personnel. However, such systems rely on observed information derived from two or more directional receptions, and three or more time-tagged receptions of radio emissions, or on navigation information from devices extraneous to the communications transceiver. No system seeks to obtain location information from the combination of observed timing information, derived from only a pair of communications radio receptions, with collateral information obtained, for example, from street maps. Therefore, it is an object of the present invention to provide a simple and effective way to identify and locate a mobile radio transceiver in any wireless communication system, including those already existing or that are contemplated, such as those for personal communication systems (PCSs), cellular telephones, specialized mobile radios (SMRs), and personal digital assistants (PDAs). It is an object of the present invention to provide an automatic location identification (ALI) and an automatic "number" identification (ANI) that facilitates national and international rural and urban emergency notification and personal security, and roadway monitoring by combining observed information derived from received radio emissions with collateral information derived from street maps, user descriptions, and other information sources.

It is also an objective of the present invention to include: providing a system in which location and identification are provided cheaply as adjuncts to communications for national and international wireless enhanced 9-1-1 (E9-1-1) emergency and routine roadside assistance notification; estimating roadway speed and providing general transportation information such as traffic congestion and flow characterization; providing such capability in a system which is both relatively easy to deploy and inexpensive to construct; providing a system which has a transportable configuration and, therefore, can be used to temporarily monitor localized regions such as road construction areas or the localities of special events such as sporting competitions, conventions, or concerts; providing a combination of processes and attributes to form an inexpensive yet robust system for localization and identification as an adjunct to a communications system.

The present invention provides an apparatus for locating a mobile radio communications transceiver in a wireless communications system that comprises two sensor stations of known location, each sensor station having a receiving antenna to receive a radio signal from the mobile transceiver, a clock mechanism such as a GPS-based receiver or rubidium clock mechanism to maintain a synchronous inter-site time standard, a signal characterization processing unit for determining the time of arrival (TOA) of a specific component of the radio signal transmitted from the mobile radio transceiver to the sensor station, a source of collateral information about other signal characteristics or the environment of operation of the mobile transceiver, a multidimensional parametric correlation processing unit for determining a probable position of the mobile transceiver from TDOA and associated collateral information, and an output indicative of the probable position of the mobile transceiver.

The present invention provides for locating a mobile radio transceiver in a cellular-telephone or cellular-like communications system using a simplified system for passively monitoring signals emitted by the mobile transceiver. In this invention, the processing at two receiving base stations of known location with inter-site synchronization determines a TDOA locus (e.g., two dimensional hyperbola) for the mobile transceiver location. This TDOA locus is then combined with collateral information to determine the likely location of the transceiver. The present invention has particular applicability to roadway transportation in that it facilitates emergency (9-1-1) services and roadside assistance, and it permits the passive monitoring of traffic flow. The collateral information includes location information derived from other than radio location methods. Such information can include the topological information of a map of the roadways in the area of the base station, or other information such as derived speed, if any, of the transceiver, or information obtained from communications from the caller in person or from equipment at the caller's location.

The present invention does not require determining position by combining two or more equivalent hyperbola from three or more base stations; two base stations can be enough. This capability may have particular usefulness in a CDMA communications network in which increased capacity is obtained through dynamic power control so that fewer base stations are likely to receive a transceiver's emissions. Nevertheless, there is nothing in the present invention that precludes using more than two base stations to further confirm the accuracy of a location or to permit locating mobile radio transceivers for which collateral information is not otherwise available. The ability to determine location from two sites using TOA/TDOA methodology has particular benefit for providing emergency assistance in that two-site reception is applicable in more environments, requires less infrastructure, and offers greatly reduced cost. The present invention is particularly useful for monitoring traffic in rural areas, where there are fewer roads with cells often located close to roads, and whose signal capture at three or more sites is highly unlikely. Thus, in rural areas, collateral information in the form of roadway topology better indicates the location of the mobile transceiver along the observed TDOA locus (hyperbola). The present invention also provides a method and apparatus for locating a mobile radio transceiver in a wireless communications system, comprising two or more sensor stations of known location, a method and means for determining a TDOA locus for the mobile radio communications transceiver, and a method and means for combining collateral information with the TDOA locus to determine the location of the mobile radio transceiver.

The present invention has the advantage of being able to determine the location of a mobile radio transceiver without requiring an embedded or integrated special-purpose device, such as a GPS receiver, with the mobile transceiver. Indeed, the present invention enables the localization of all existing cellular telephones. The cost of deploying a location system of the present invention is low. This low start up cost means that the system can be deployed faster so that consumers can realize the benefits sooner and at less expense.

DETAILED DESCRIPTION

Figure 1:
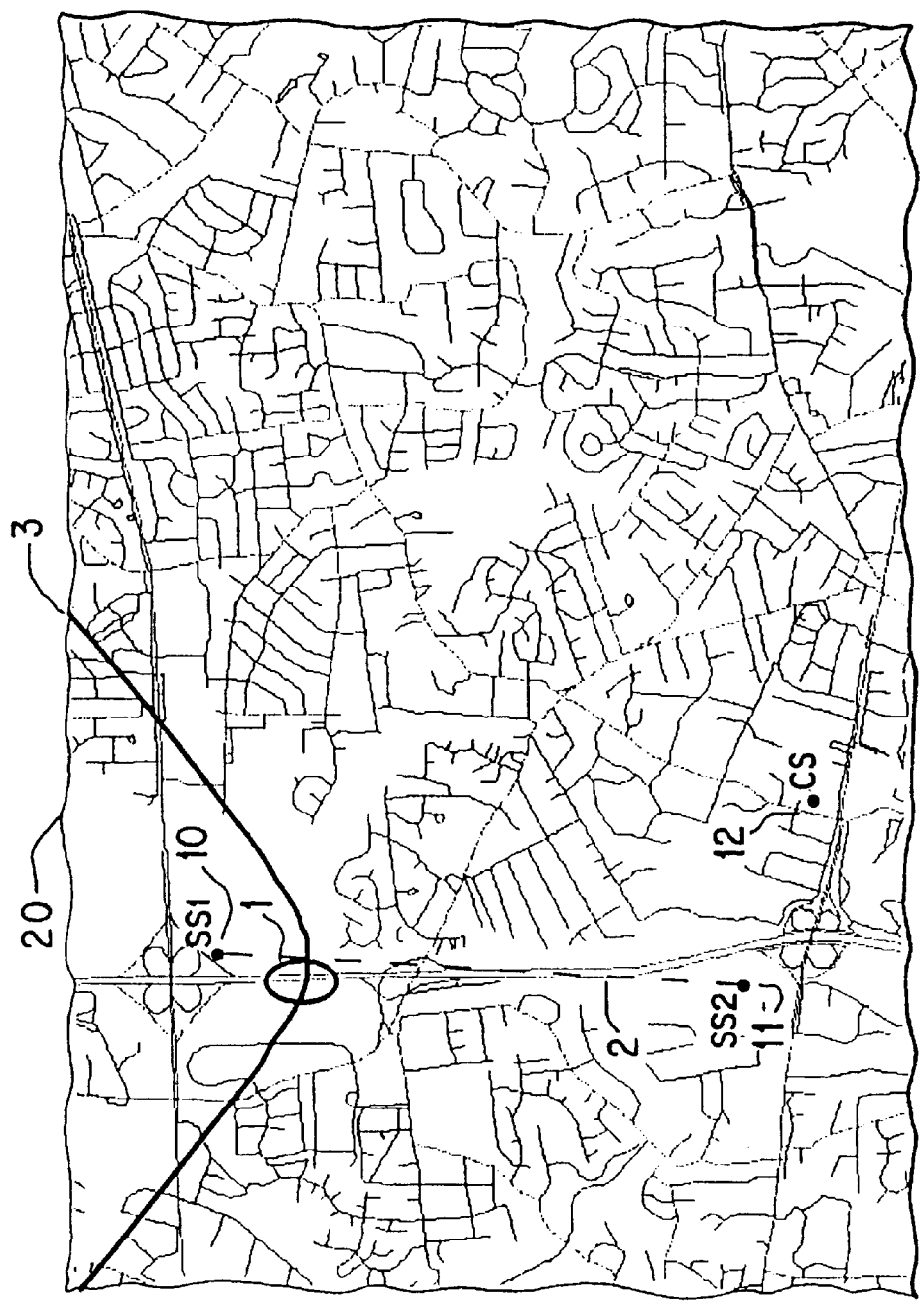
FIG. 1 illustrates the location of a cellular telephone transceiver that can be obtained through the present invention by the correlation of time-difference-of-arrival (TDOA) information with the road location information inherent in a road network map.

FIG. 1 shows how the present invention can determine the location of a mobile transceiver. FIG. 1 shows collateral information in the form of a street map of a portion of Annandale, Va., in the United States, and a mobile radio transceiver in the form of a cellular telephone. A vehicle having the cellular telephone is in the localization area labeled 1 along a highway 2 (US Interstate 495). Sensor stations located at positions 10 and 11 are used to determine a TDOA locus 3.

The TDOA locus 3 ia overlaid on the topological data 20 that represents the street map of the area. The data for these vectorized maps of urban areas are readily available from, for example, ETAK Inc., in Menlo Park, Calif., Navigation Technologies, in Sunnyvale, Calif., Roadnet Technologies, Inc., in Timonium, Md., or the Bureau of the Census, U. S. Department of Commerce, in Washington, DC. These maps represent collateral information in the form of the topology of the area in which the mobile radio transceiver operates. The present invention seeks to use such collateral information to enable a control station (at 12 in FIG. 1) to use a TDOA locus obtained from two sensor stations together with the collateral information to determine the location of mobile radio transceivers operating in area 1.

Figure 2:
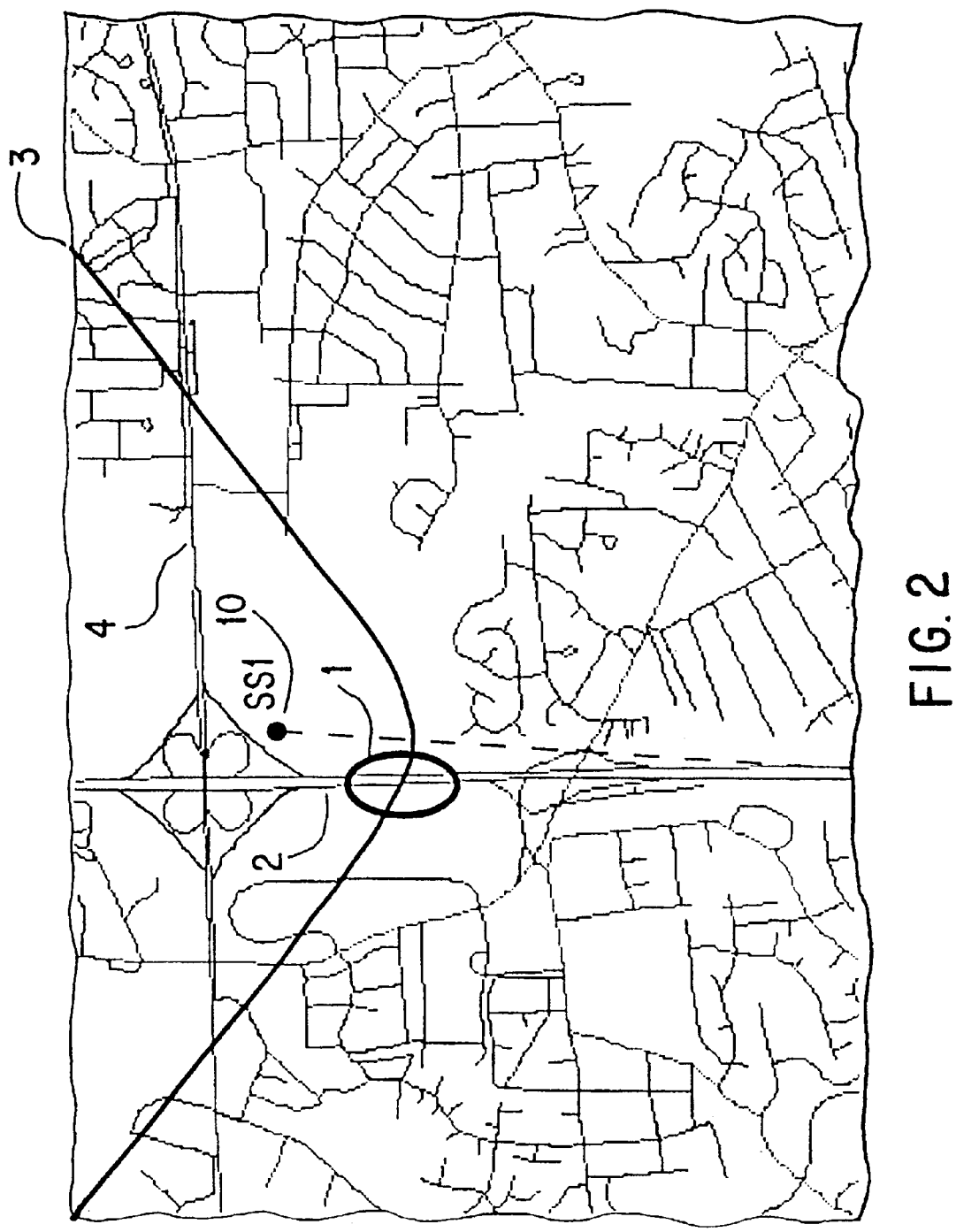
FIG. 2 shows an expanded view of the intersection of the TDOA line of FIG. 1 with the road of interest.

FIG. 2 shows an expanded view of the localization area 1 shown in FIG. 1. The TDOA locus 3 is shown as crossing the highway labeled 2 (US Interstate 495) and the street labeled 4 (Virginia (VA) Route 50). From the TDOA locus 3, there is no way to determine on which of the streets 2 or 4 the mobile transceiver is located. However, as discussed below in reference to FIG. 4, using multiple TDOA loci at different times might yield an approximate speed of travel for the mobile transceiver in area 1. A high rate of travel, say 90 km/hr (55 mph), for a communicating cellular telephone implies that the mobile transceiver is on the main highway 2 (US Interstate 495) rather than on the residential street 4 (Virginia (VA) Route 50) where the posted speed limit, 60 km/hr (35 mph), is distinctly less than the observed rate. Thus, by applying collateral information in the form of the relative posted speed limits or the average speed distributions for the roads 2 and 4 in FIG. 2, the control station 12 can infer on which street to place the probable localization area 1.

In the preceding example, it might appear that the control station 12 cannot determine whether the mobile transceiver is on the main highway 2 or some other street 4 solely from TDOA loci unless the transceiver is also moving at a high rate of speed. For the localization of a stationary transceiver, emergency (9-1-1) assistance would require some other form of collateral information. For example, the assisting dispatcher could obtain additional information by asking the parties requesting the assistance whether they are on a major road and, if not, seek some other form of descriptive information, such as street names or known landmarks. The geographic information inherent in such solicited data, when combined with the positional information in the TDOA measurements, enables the estimation of the transceivers' locations.

Moreover, even the absence of motion has significance for other purposes such as monitoring traffic flow. Based on common traffic characteristics, the control station 12 could presume that most cellular telephone calls from the region of area 1 would originate from the main highway 2. The transceivers should predominantly exhibit a ground speed corresponding to the posted limits of the road. If the characteristic speeds of such transceivers are observed to be significantly below that of normal roadway conditions in or around area 1, such information would suggest that the main highway 2 is abnormally congested. Traffic alerts could be issued indicating the congestion, and emergency or other service vehicles could be dispatched to investigate the origin of the congestion if it suggests that an accident has occurred. None of these functions require additional information other than the timings of different TDOA loci and knowledge of normal road characteristics, but could always be augmented by such information if any is available.

Figure 3:
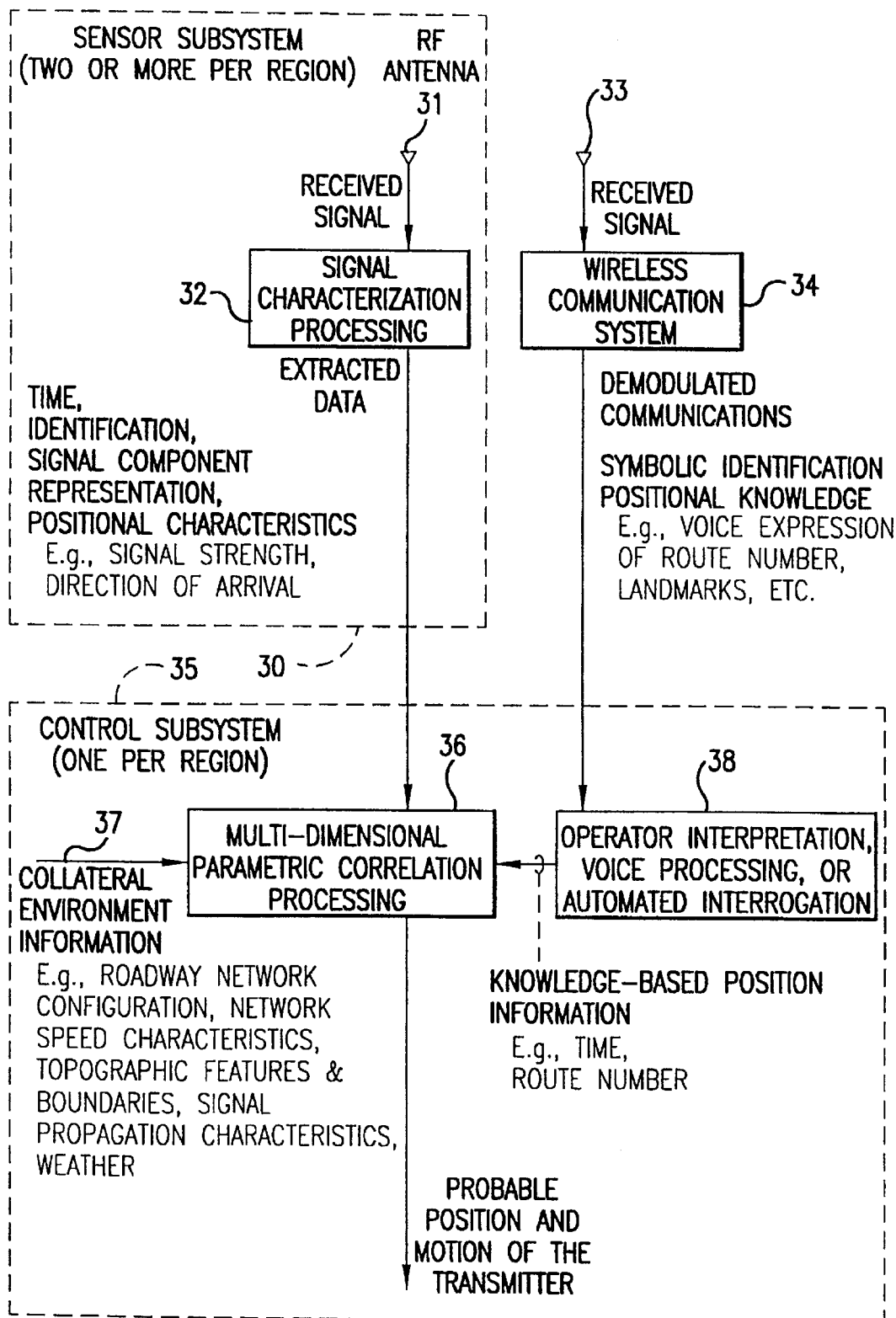
FIG. 3 shows the functional components of the system that enables the integration of TDOA and other characteristic signal information with the collateral geographic information derived from other sources to obtain the locations of wireless transceivers under normal communications operations.

FIG. 3 shows a block diagram of a system to carry out the present invention. A sensor subsystem 30 includes a RF antenna 31 that is connected to a signal characterization processing unit 32. The RF antenna 31 can be the existing communications antenna. The signal characterization processing unit 32 identifies the time at which the RF signal measurement is obtained based on synchronized inter-site timing standards such as GPS receivers or rubidium clock mechanisms. The sensor system passively receives the radio frequency signals that occur in the normal use of the wireless communication system 32 and converts them into information for the control system 35 which is described below. This information includes the time at which a processed signal component arrived, a representation of the component (if needed), and the identification of its transceiver. This information can also include observations of collateral, position-related characteristics such as direction of motion or rate of change in TDOA (relative Doppler shift), signal strength, direction of signal arrival or its rate of change, and even two-way signal travel time in a communications system of very tightly controlled transceivers with transponding protocols and large signal bandwidth. By extending the time duration (i.e., the integration time or "dwell" time) over which the analyses of the captured signal are performed, the processing can produce the measure of the rate of change of TDOA (i.e., the relative Doppler shift), as well as of the TDOA itself. This rate of change can be detectable from the extended measurement process because the standard assumption of constant TDOA during the measurement process will not be valid and will produce degraded measurements when the signal is received from a perceptibly moving radio transceiver. The rate of change of TDOA is related to the perpendicular velocity of motion of the communicating transceiver. As an added measure of the transceiver position, the characterization processing can determine the received signal power (i.e., the variance or mean square of the bias-free signal level). The signal power is indicative (through signal propagation evaluations discussed further below) of the range or distance from the receiving site to the mobile transceiver, and the rate of change of signal power or other power variation characteristics can be indicative not only of the radial speed of movement of the transceiver, but also of the physical obstructions or multipath interference causes that are known to accompany signal propagation from known geographic regions. Unobstructed two-way signal travel time is proportional to twice the range from receiving site to the location of the mobile transceiver. All of the measured physical characteristics of a received radio signal form the bases for localization processing in which the measurements are correlated with known relations to hypothesized transceiver position and motion.

The information of the measurement times and uncertainties is collected from two sensor stations and inserted into a multi-dimensional parametric correlation processing unit 36. The processing unit 36 combines the timing information with other, collateral information from inputs 32, 37, or 38 to determine the location of the transceiver. The phrase "collateral information" applies to observed characteristics that augment the timing data and also includes information derived from sources other than the radio emissions of the mobile radio transceiver. Collateral information includes information on the environment in which the mobile transceiver is believed to be operating, e.g., the configuration of the roadway network, topographical features and boundaries, signal propagation characteristics, information on the weather and its effect on signal propagation and roadway traffic conditions, and also includes verbalized or other description of route number, road name, speed, nearby landmarks, or other position-sensitive information communicated from the mobile transceiver. The roadway and topographical representation data is available from distributors, such as those identified above for mapping data, of databases for geographic information systems. Additional data representing the posted speed limits of the road sections contained in the data bases are also generally available from the map data producers or alternatively from state government transportation departments. Additionally, the characteristic speed distributions of traffic on various road sections as a function of time of day, weather conditions, day of week, and season of year are often available from traffic flow studies that are routinely conducted by state departments of transportation. Alternatively, such data characterizing the positional dependencies of traffic flow can be accumulated from the flow statistics collected with the present invention in unambiguous events, and can then be recursively updated to obtain more rapid and robust determinations as the statistical precision of the databases is augmented. The relationship between signal strength (i.e., power) and range is supporting information that can be available in a database as collateral data representing signal propagation characteristics. A standard relation between strength and range is that the received signal strength or power is inversely proportional to the square of range. However, in the multipath environment which normally characterizes short wavelength communications (such as that of cellular systems), the strength can be typically proportional to the inverse of the second to sixth power of the range and is highly dependent upon the direction of signal arrival and the weather conditions. Thus the utility of signal strength as an indicator of range depends on the accuracy to which the data base of collateral information represents the strength-to-range transformation, i.e., the signal propagation characteristics. For an approximate correlation of measures of signal power to the estimated range from receiver to mobile transceiver, signal propagation analyses can apply the static or dynamic projections of RF propagation predictions. Computer software facilities for such signal propagation projections are available from Applied Spectrum Research, in Boulder, Colo., C.E.T., Inc., in Edgewater, Fla., SoftWright, in Denver, Colo., or H2A Communications, in Moscow, Id. The propagation analyses can account for weather effects, ground topography and composition, building heights, and directionally dependent interference or background noise, as desired.

Knowledge of the terrain conditions along the approximate paths of signal arrival can be used in estimating their effect on signal propagation. Furthermore, geographic features, such as hills or water boundaries, limit the domain of candidate positions at which the transceiver could likely be located in known ways. Thus, such topographic information can also be used as collateral information to enhance the efficiency and accuracy of any determination of location.

In rural areas, it is contemplated that correlating the TDOA information with collateral information in the form of topological map-matching (i.e., matching of location information to the known geographic locations of roads or other features of the landscape) would be enough in most instances to monitor traffic flow along main roads as well as to facilitate the dispatch of emergency vehicles and roadside assistance. Rural areas have relatively few roads such that the intersection of one with a TDOA locus for the two sensor stations and the mobile radio transceiver would be sufficient to uniquely identify the probable position of the mobile radio transceiver.

In urban areas, it is thought to be less likely that the timing information and roadway map information will be enough, by and of itself, to uniquely locate the position of the mobile radio transceiver. In such instances additional information may be needed. The present invention contemplates applying collateral information in a knowledge-based position information processor 38. Processor 38 could integrate information from additional sources such as the geographic representation of the knowledge and judgment of an operator of an emergency assistance (9-1-1) center regarding the apparent position or probable region of the mobile radio transceiver.

The present invention also contemplates receiving supporting, descriptive information from the wireless communications system. The position-dependent information extracted from the received RF signal can be augmented with collateral information from the wireless communications system 34 in FIG. 3. RF antenna 33 can be, for example, the base station of a cellular telephone system that is nearest the remote transceiver, e.g. cellular telephone. The wireless communication system 34 tends to the demodulation of the communications from the remote transceiver. The descriptive information received through the wireless communication system can include positional knowledge such as voice expression of the fact that the transmission is from a vehicle on a roadway or the name of the road on which the mobile transceiver is traveling, which can be transformed into symbolic identification for use as collateral information in the correlated localization processing with TDOA measurements. In the case of requests for assistance (such as in 9-1-1 calls), the answering operator routinely asks for the persons placing the calls to identify their calling numbers and their locations. Callers who do not know where they are can still describe their surroundings over the telephone. Thus, the present invention is designed to aid the assisting operator by exploiting information that the operator can rapidly elicit to quickly provide accurate locations. With the expression of a route number or street name from a caller, the correlated intersection of that road with an estimated time difference of signal arrival quickly provides the probable location of the caller. When the route of travel is not known by the caller, the assisting operator can solicit information about the speed of travel and the proximity of prominent landmarks that are along the observed time difference of signal arrival. All such position-related information, whether obtained manually or by automated analysis, can then be transformed into geographical form through graphical interaction or automated geographic interpretation for inclusion in the correlated evaluation with the extracted signal characteristics.

The entry of the geographical knowledge or understanding of the operator or human information source may be assisted through graphical interaction between the human and a work station terminal equipped with a graphical pointing device for automated point determination. While observing a computer-driven map display of the relevant area of roads, the operator could use the graphical input device to select an approximate position, a road identified by a caller's voice, or an ellipse or polygon of probable location based on communicated descriptions. Mathematical transformations for conversions of position representations between planar projection coordinates used in geographic displays and geodetic reference coordinates used with navigation and location reference systems are described in U.S. Geological Survey Professional Paper 1395, titled "Map Projections—A Working Manual", by John P. Snyder, incorporated herein by reference.

Alternatively, the operator could provide a textual entry of a communicated or inferred road name, a speed, a landmark, or a road intersection that may be communicated, perhaps in response to the operator's queries. This textual data could then be converted into approximate position information through correlation with a text-to-position transformation database such as that contained in addressing databases of the United Parcel Service maps or the 9-1-1 databases of the Public Safety Answering Points. In advanced system implementations, the queries for correlated information could be solicited under automated control by voice synthesis or by computer interaction with a processor integrated into a vehicle's or user's communication device, and the responses could be analyzed by voice recognition processing or direct data interface for entry into the correlation processing with the extracted timing and associated characteristic measurements.

The multi-dimensional parametric correlation processing unit 36 in FIG. 3 combines the disparate parametric information from inputs 32, 37, and 38 to yield a probabilistic description of the location and motion of the mobile transceiver. The knowledge representation of the input information and its uncertainly can take numerous forms, such as discrete attribute vectors in which each element of the vector represents the value of a particular discrete attribute where the values may be boolean, integer, floating point, or symobilic, and particular choices of the values will have attendant confidences; continuous numeric parameters with associated statistical errors; and/or fuzzy logic parameters. The correlation process can employ numerous engines and uncertainty management systems, each suited to the appropriate knowledge representation, such as maximum likelihood or least squares estimators, joint probablistic data association algorithms, probability density function multi-target tracking systems for continuous parameters; multi-hypothesis uncertainty management systems; rule-based expert systems with multi-confidence production rules that combine discrete logical assertions with continuous numeric information; fuzzy logic engines; and causal belief networks.

As an example of the correlation processing, consider the case where a mobile transceiver is detected moving in an urban setting in ignorane fo the road along which it is traveling but with some knowledge of nearby landmarks. The TDOA locus with its attendant location confidence band can be found to intersect numerous roads, landmarks, rivers, and bodies of water, for example, by rasterization of these objects and subsequent pixel overlay detections, followed by interrogation of databases of these objects to find candidates for the intersections or candidates for objects near intersections of TDOA loci with other objects, such as landmarks nearest the TDOA intersections with roads. The results of these interrogations will be captured in an appropriate knowledge representation. Applying constraints, via uncertainty management, obtained from a priori ranges for cell sites, as well as more specific signal strength, or from caller descriptions of nearby landmarks, can reduce the probabilities or confidences for some candidates and increase those for others.

Figure 4:
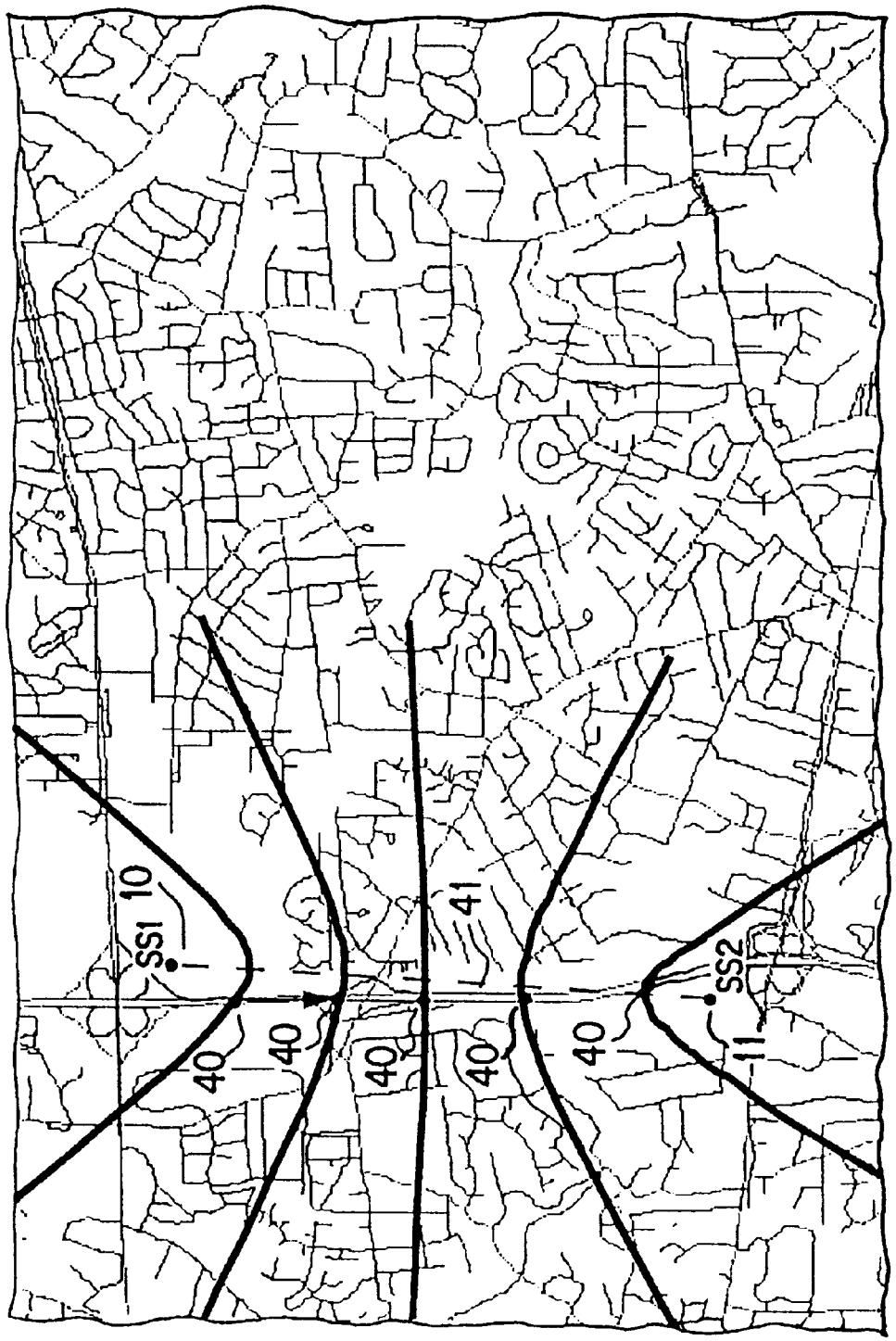
FIG. 4 shows a display of the intersections for TDOA data measurements with the road being traveled by an active cellular telephone, allowing the calculation of speed and direction of motion estimates.

FIG. 4 shows how to calculate the speed and direction of a mobile radio transceiver using information derived from successive measurements of time differences of signal arrival with the example of a mobile radio transceiver 40 moving down a limited access highway 41 (Interstate highway 495 is shown). The operator or processor indicates points of intersection of TDOA loci with a designated roadway (map-matching). The processor calculates the average speed between successive points. The rate of change of time difference of arrival of a signal from the mobile radio transceiver 40 is proportional to the component of velocity of the transceiver that is perpendicular to the TDOA locus for the receivers and the mobile transceiver. With the projection of this component onto the tangent to a candidate road at the point of intersection of the TDOA loci with the road, the corresponding speed and direction of motion can be estimated. Alternatively, the successive observation of time differences of arrival and the evaluation of the motion implications of their intersections with candidate road trajectories enable the more accurate estimation of motion parameters. Through correlation with a representation of appropriate road network speed distributions, further assessment of the probabilities that the estimated speeds could reasonably occur for each candidate route enables an even more likely estimate of the actual route being followed by the mobile transceiver.

The apparatus for the present invention can include general purpose processing facilities such as those of microprocessor workstations based on the Intel 80486 or Pentium central processing units (CPUs) or the Motorola 68040 or PowerPC CPUs. The correlation calculations will determine the optimal associations of measured timings and other possible characteristics, communicated information, and/or human assessments with the supporting, collateral information stored on mass storage facilities such as the disks, CD ROMs, bubble memories, and tape drives common to such workstations and similar database servers. For rapid access to large quantities of geographical data of various types, the high-usage, mass-storage facilities should be interfaced to the data processing facilities via high-throughput, data communications paths, such as those employing direct processor-bus disk interfaces and ethernet interprocessor networks.

Figure 5:
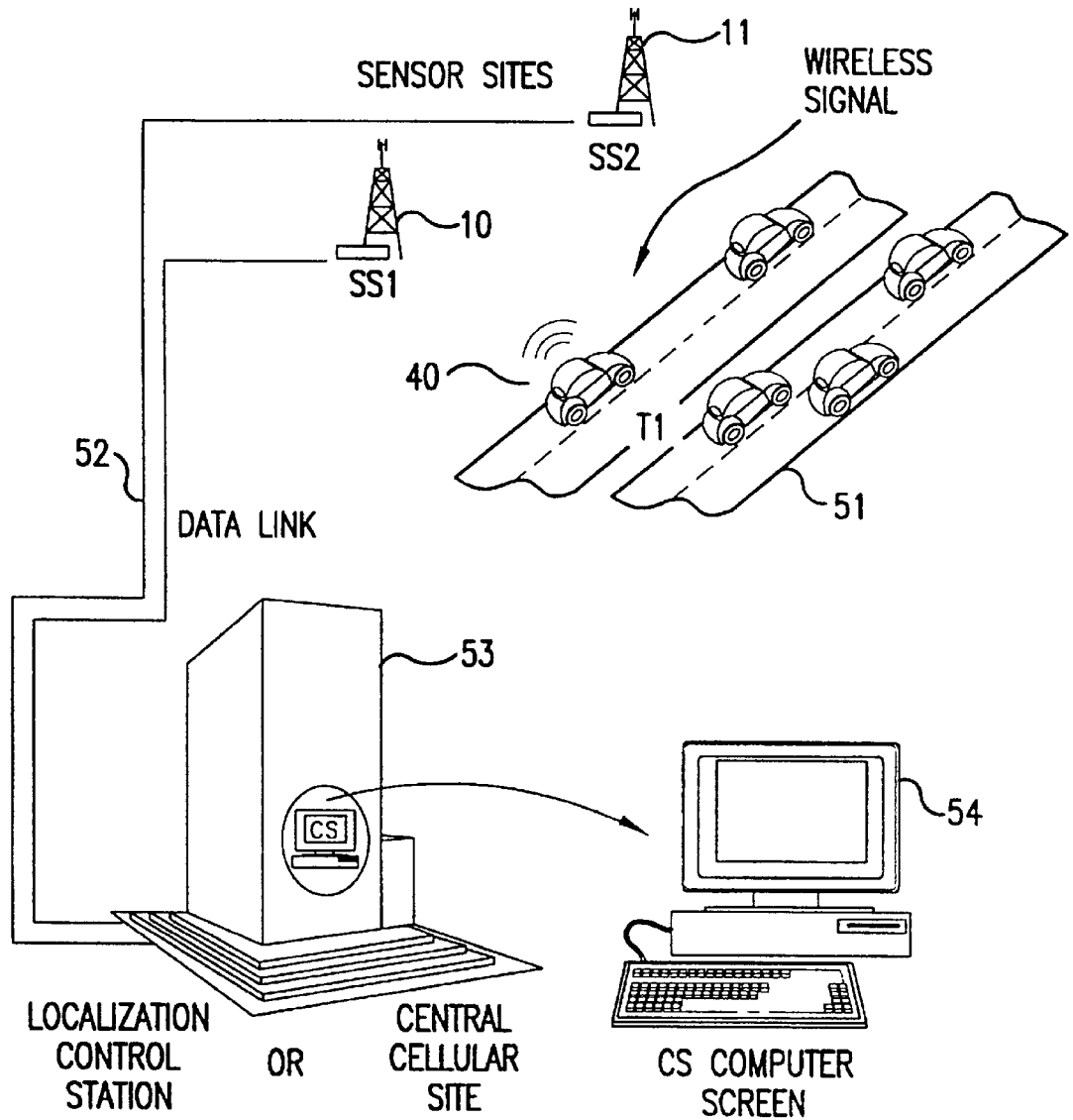
FIG. 5 shows a configuration for a system that applies the functions shown in FIG. 3.

FIG. 5 shows an implementation of the present invention applied as a way to monitor traffic flow using an existing cellular telephone network as the wireless communications system. The objective is to use a mobile transceiver 40 as a probe to determine the traffic flow along the highway 51. The representative cellular telephone 40 emits radio frequency signals that the receiver 32 at the sensor stations 10 and 11 intercept. The information pertaining to the timing of signal capture and other observed signal characteristics is then transmitted to a control subsystem, which may be at a central control station 53. The TDOA and correlated information is processed and can then be displayed on a computer monitor 54 together with other useful information derived therefrom such as the rate of travel of the vehicle on the highway 51.

The principles, preferred embodiments and modes of operation of the present invention have been set forth in the foregoing specification. The embodiment disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously envisioned. Numerous variations and changes can be made to the foregoing illustrative embodiments without departing from the scope and spirit of the present invention as set forth in the appended claims.

What is claimed is:

1. An apparatus for locating a mobile radio communications transceiver in an operating environment served by a wireless communications system, comprising:

two sensor stations of known location that receive a radio, signal form the mobile transceiver, each sensor station having at inter-site synchronization mechanism for common time standard maintenance, and each sensor station further having a corresponding signal characterization processing unit that determines from the radio signal, time of signal arrival information;

a source of collateral information related to a location of the mobile transceiver;

a processing unit that determines time difference of signal arrival information based on the time of signal arrival information determined by each said signal characterization processing unit; and a processing unit that determines a probable position of the mobile transceiver based on the time difference of signal arrival information and the collateral information.

2. An apparatus for locating a mobile radio communications transceiver in a wireless communications system as claimed in claim 1, wherein the collateral information comprises databased information.

3. An apparatus for locating a mobile radio communications transceiver in a wireless communications system as claimed in claim 2, wherein the databased information comprises signal propagation characteristics of the operating environment of the mobile transceiver.

4. An apparatus for locating a mobile radio communications transceiver in a wireless communications system as claimed in claim 2, wherein the databased information comprises traffic flow characteristics.

5. An apparatus for locating a mobile radio communications transceiver in a wireless communications system as claimed in claim 4, wherein the traffic flow characteristics comprise speed distribution information.

6. An apparatus for locating a mobile radio communications transceiver in a wireless communications system as claimed in claim 2, wherein the databased information comprises localized event information.

7. An apparatus for locating a mobile radio communications transceiver in a wireless communications system as claimed in claim 2, wherein the databased information comprises descriptions of users of the wireless communication system.

8. An apparatus for locating a mobile radio communications transceiver in a wireless communications system as claimed in claim 2, wherein the databased information comprises topological information.

9. An apparatus for locating a mobile radio communications transceiver in a wireless communications system as claimed in claim 8, wherein the topological information comprises map information.

10. An apparatus for locating a mobile radio communications transceiver in a wireless communications system as claimed in claim 8, wherein the topological information comprises roadway configuration information.

11. An apparatus for locating a mobile radio communications transceiver in a wireless communications system as claimed in claim 10, wherein the roadway configuration information comprises speed limit information.

12. An apparatus for locating a mobile radio communications transceiver in a wireless communications system as claimed in claim 8, wherein the topological information comprises information concerning landmarks.

13. An apparatus for locating a mobile radio communications transceiver in a wireless communications system as claimed in claim 1, wherein the collateral information comprises communicated information.

14. An apparatus for locating a mobile radio communications transceiver in a wireless communications system as claimed in claim 13, wherein the communicated information comprises input from an operator.

15. An apparatus for locating a mobile radio communications transceiver in a wireless communications system as claimed in claim 13, wherein the communicated information comprises information on traffic conditions.

16. An apparatus for locating a mobile radio communications transceiver in a wireless communications system as claimed in claim 13, wherein the communicated information comprises road identification information.

17. An apparatus for locating a mobile radio communications transceiver in a wireless communications system as claimed in claim 1, wherein the collateral information comprises signal strength.

18. An apparatus for locating a mobile radio communications transceiver in a wireless communications system as claimed in claim 1, wherein the collateral information comprises two way signal travel time.

19. An apparatus for locating a mobile radio communications transceiver as claimed in claim 1, wherein the inter-site synchronization mechanism comprises a GPS receiver or a rubidium timing mechanism.

20. The apparatus of claim 1, wherein the time difference of arrival information is determined based on only the time of arrival information determined by each said signal characterization processing unit.

21. The apparatus of claim 20, wherein the probable position is determined based on only said time difference of arrival information and said collateral information.

22. The apparatus of claim 1, wherein the probable position is determined based only on said time difference of arrival information and said collateral information.

23. A method for locating a mobile radio communications transceiver in a wireless communications system that includes two sensor stations of substantially known location, comprising:

receiving, at the two sensor stations, a radio signal from the mobile transceiver;

determining time of signal arrival information based on said radio signal received at the two sensor stations;

determining time difference of signal arrival information based on said time of signal arrival information;

accessing collateral information related to a location of the mobile transceiver; and determining a probable position of the mobile transceiver based on said time difference of signal arrival information and the collateral information.

24. A method for locating a mobile radio communications transceiver in a wireless communications system as claimed in claim 23, wherein the collateral information comprises databased information.

25. A method for locating a mobile radio communications transceiver in a wireless communications system as claimed in claim 24, wherein the databased information comprises signal propagation characteristics of the operating environment of the mobile transceiver.

26. A method for locating a mobile radio communications transceiver in a wireless communications system as claimed in claim 24, wherein the databased information comprises traffic flow characteristics.

27. A method for locating a mobile radio communications transceiver in a wireless communications system as claimed in claim 2, wherein the traffic flow characteristics comprise speed distribution information.

28. A method for locating a mobile radio communications transceiver in a wireless communications system as claimed in claim 24, wherein the databased information comprises localized event information.

29. A method for locating a mobile radio communications transceiver in a wireless communications system as claimed in claim 24, wherein the databased information comprises descriptions of users of the wireless communication system.

30. A method for locating a mobile radio communications transceiver in a wireless communications system as claimed in claim 24, wherein the databased information comprises inputting topological information.

31. A method for locating a mobile radio communications transceiver in a wireless communications system as claimed in claim 30, wherein the topological information comprises map information.

32. A method for locating a mobile radio communications transceiver in a wireless communications system as claimed in claim 30, wherein the topological information comprises roadway configuration information.

33. A method for locating a mobile radio communications transceiver in a wireless communications system as claimed in claim 30, wherein the topological information comprises speed limit information.

34. A method for locating a mobile radio communications transceiver in a wireless communications system as claimed in claim 30, wherein the topological information comprises information concerning landmarks.

35. A method for locating a mobile radio communications transceiver in a wireless communications system as claimed in claim 23, wherein the collateral information comprises communicated information.

36. A method for locating a mobile radio communications transceiver in a wireless communications system as claimed in claim 35, wherein the communicated information comprises input from an operator.

37. A method for locating a mobile radio communications transceiver in a wireless communications system as claimed in claim 35, wherein the communicated information comprises information on traffic conditions.

38. A method for locating a mobile radio communications transceiver in a cellular communications system as claimed in claim 23, wherein the collateral information comprises signal strength information.

39. A method for locating a mobile radio communication transceiver in a cellular communications system as claimed in claim 25, wherein the collateral information comprises two way signal travel time.

40. A method for locating a mobile radio communications transceiver in a wireless communications system as claimed in claim 23, wherein the collateral information comprises information supplied by the wireless communication system.

41. A method for locating a mobile radio communications transceiver in a wireless communications system as claimed in claim 40, wherein the information supplied by the wireless communication system comprises signal strength information.

42. A method for locating a mobile radio communications transceiver in a wireless communications system as claimed in claim 23, further comprising determining a plurality of time difference of signal arrival formation from the two sensor stations and determining a relative motion of a plurality of time difference of arrival hyperbola from the plurality of time difference of signal arrival information.

43. The method of claim 23, wherein said step of determining said time difference of arrival information comprises determining said time difference of arrival information based only on said time of arrival information determined by each said signal characterization processing unit.

44. The method of claim 43, wherein said step of determining said probable position comprises determining said probable location based only on said time difference of arrival information and said collateral information.

45. The method of claim 23, wherein said step of determining said probable position comprises determining said probable location based only on said time difference of arrival information and said collateral information.

46. A method for locating a mobile transceiver in a wireless communications system that includes a fist and second sensor station, the method comprising the steps of:
  (a) receiving a radio signal at each of the first and second sensor stations;
  (b) determining first time of signal arrival information corresponding to when the radio signal is received at the first sensor station;
  (c) determining second time of signal arrival information corresponding to when the radio signal is received at the second sensor station;
  (d) determining time difference of arrival information based on said first time of signal arrival information and said second time of signal arrival information;
  (e) accessing collateral information relating to a location of the mobile transceiver; and
  (f) determining a probable location of the mobile transceiver based on said time difference of arrival information and said collateral information.

47. The method of claim 46, wherein step (d) further comprises the step of determining a first set of time difference of arrival loci based on said time difference of arrival information.

48. The method of claim 47, wherein step (f) comprises determining said probable position based on said first set of time difference of arrival loci and said collateral information.

49. The method of claim 48, wherein said collateral information comprises roadway configuration information which includes speed limit information.

50. The method of claim 49, wherein step (d) further comprises the step of determining a second set of time difference of arrival loci by repeating steps (a) through (c) using the same first and second sensor stations.

51. The method of claim 50, wherein step (f) further comprises:
  determining a velocity set for the mobile transceiver based on said first set of time difference of arrival loci and said second set of time difference of arrival loci; and
  determining said probable position based on said velocity set for the mobile transceiver and said roadway configuration information.

52. The method of claim 50, wherein step (f) further comprises:
  determining a direction of travel of the mobile transceiver based on said first time difference of arrival loci and said second time difference of arrival loci.

53. The method of claim 46, wherein step (e) comprises receiving said collateral information from an information provider.

54. The method of claim 46, wherein step (e) comprises determining said collateral information by measuring a signal strength of the radio signal, wherein said collateral information comprises said measured signal strength.

55. The method of claim 46, wherein step (e) comprises retrieving said collateral information from a database.

56. The method of claim 46, wherein said collateral information comprises at least one of signal propagation characteristics of the operating environment of the mobile transceiver, traffic flow characteristics, a description of users of the wireless communication system, topological information, standard route information, map information and communicated information.

57. The method of claim 46, wherein each of the sensor stations includes an inter-site synchronization mechanism for common time standard maintenance.

58. The method of claim 46, wherein said time difference of signal arrival information is determined based on only said first time of signal arrival information and said second time of signal arrival information.

59. The method of claim 58, wherein said probable position is determined based on only said time difference of signal arrival information and said collateral information.

60. The method of claim 46, wherein said probable position is determined based only on said time difference of signal arrival information and said collateral information.

61. An apparatus for locating a mobile transceiver in a wireless communications system that includes a first and second sensor station each having an inter-site synchronization mechanism for common time standard maintenance, comprising:
  means for receiving a radio signal at each of the first and second sensor stations;
  means for determining first time of signal arrival information corresponding to when the radio signal is received at the first sensor station;
  means for determining second time of signal arrival information corresponding to when the radio signal is received at the second sensor station;
  means for determining time difference of arrival information based on said first time of signal arrival information and said second time of signal arrival information;
  means for accessing collateral information relating to a location of the mobile transceiver; and
  means for determining a probable location of the mobile transceiver based on said time difference of arrival information and said collateral information.

62. A system for locating a mobile transceiver comprising:
  a first sensor station that receives a radio signal transmitted by the mobile transceiver, said first sensor station having a corresponding first signal characterization processing unit that determines first time of signal arrival information based on said radii signal transmitted by the mobile transceiver;
  a second sensor station tat receives said radio signal transmitted by the mobile transceiver, said second sensor station having a corresponding second signal characterization processing unit that determines second time of signal arrival information based on said radio signal transmitted by the mobile transceiver;
  a processing unit, in communications with said first and second sensor stations, that determines time difference of signal arrival information based on said first time of signal arrival information and said second time of signal arrival information; and a processing unit that determines a probable location of the mobile transceiver based on said time difference of signal arrival information and collateral information relating to a location of the mobile transceiver.

63. The system of claim 62, wherein said processing unit receives laid collateral information from an information provider.

64. The system of claim 62, wherein at least one, of said first and second signal characterization processing units determines said collateral information by measuring a signal strength of said radio signal, wherein said collateral information comprises said measured signal strength.

65. The system of claim 62, wherein said processing unit retrieves said collateral information from a database.

66. The system of claim 62, wherein each of the first and second sensor stations include an inter-site synchronization mechanism for common time standard maintenance.

67. The system of claim 62, wherein said time difference of signal arrival information is determined based on only said first time of signal arrival information and said second time of signal arrival information.

68. The system of claim 67, wherein said probable position is determined based on only said time difference of signal arrival information and said collateral information.

69. The system of claim 62, wherein said probable position is determined based only on said time difference of signal arrival information and said collateral information.

70. An apparatus for locating a mobile radio communications transceiver in an operating environment served by a wireless communications system, comprising:

two sensor stations of known location that receive a radio signal from the mobile transceiver;

a source of collateral information related to a location of the mobile transceiver;

a processing unit that determines time difference of signal arrival information based on said radio signal received at the two sensor stations; and a processing unit that determines a probable position of the mobile transceiver based on said time difference of signal arrival information and said collateral information.

71. A method for locating a mobile transceiver in a wireless communications system that includes a first and second sensor station having known locations, the method comprising the steps of receiving, at the first and second sensor stations, a radio signal from the mobile transceiver;

accessing collateral information related to a location of the mobile transceiver; and determining time difference of signal arrival information based on said radio signal received at the first and second stations;

determining a probable position of the mobile transceiver based on said time difference of signal arrival information and said collateral information.

* * * * *